US009276999B2

(12) United States Patent
Tipnis et al.

(10) Patent No.: US 9,276,999 B2
(45) Date of Patent: Mar. 1, 2016

(54) SYSTEM AND METHOD FOR PROVIDING A SERVICE

(75) Inventors: Ajay A. Tipnis, Murphy, TX (US); Chandra H. Kamalakantha, Plano, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 230 days.

(21) Appl. No.: 13/878,420

(22) PCT Filed: Oct. 15, 2010

(86) PCT No.: PCT/US2010/052794
§ 371 (c)(1),
(2), (4) Date: Apr. 8, 2013

(87) PCT Pub. No.: WO2012/050584
PCT Pub. Date: Apr. 19, 2012

(65) Prior Publication Data
US 2013/0198360 A1    Aug. 1, 2013

(51) Int. Cl.
*G06F 15/16*  (2006.01)
*H04L 29/08*  (2006.01)
*G06Q 10/06*  (2012.01)
(Continued)

(52) U.S. Cl.
CPC ............. *H04L 67/10* (2013.01); *G06F 9/5027* (2013.01); *G06F 9/541* (2013.01); *G06Q 10/06* (2013.01)

(58) Field of Classification Search
CPC ....... H04L 67/10; G06F 9/541; G06F 9/5027; G06Q 10/06
USPC ........... 709/200–203, 217–227, 228; 707/763
See application file for complete search history.

(56) References Cited

U.S. PATENT DOCUMENTS

| 7,613,404 | B2 * | 11/2009 | Takeuchi et al. | ................. 399/8 |
| 7,752,639 | B2 * | 7/2010 | Beisiegel et al. | ............ 719/332 |
| 7,760,383 | B2 * | 7/2010 | Matsuda et al. | ............ 358/1.15 |

(Continued)

FOREIGN PATENT DOCUMENTS

| JP | 2008-130033 A | 6/2008 |
| KR | 20020041357 | 6/2002 |

(Continued)

OTHER PUBLICATIONS

Hewlett-Packard Development Company, L.P., "HP SOA Systinet software," Data Sheet, May 2007, <http://www.structuredweb.com/sw/swchannel/customercenter/documents/6888/16463/hpsystinetsoftware.pdf>.

(Continued)

*Primary Examiner* — Moustafa M Meky
(74) *Attorney, Agent, or Firm* — Hewlett Packard Enterprise Patent Department

(57) ABSTRACT

According to one example of the present invention, there is provided a system for providing a service. The service is accessible from a client application and is provided through a service application using a set of service provider resources. The system comprises a mapping module for generating mapping data, the mapping data being generated in part from an enterprise architecture definition, in part from a vocabulary definition; and in part from a client context definition. The system additionally comprises a communication module for receiving a communication request, transforming the communication request using the generated mapping data, and processing the transformed communication request.

14 Claims, 4 Drawing Sheets

(51) Int. Cl.
*G06F 9/50* (2006.01)
*G06F 9/54* (2006.01)

(56) References Cited

U.S. PATENT DOCUMENTS

| | | | |
|---|---|---|---|
| 8,819,784 B2* | 8/2014 | Monjas Llorente et al. | 726/4 |
| 2004/0177335 A1 | 9/2004 | Beisiegel et al. | |
| 2005/0138181 A1 | 6/2005 | Gallet et al. | |
| 2006/0066898 A1* | 3/2006 | Matsuda et al. | 358/1.15 |
| 2006/0136895 A1 | 6/2006 | Barr et al. | |
| 2009/0106266 A1 | 4/2009 | Donatelli et al. | |
| 2012/0317624 A1* | 12/2012 | Monjas Llorente et al. | 726/4 |

FOREIGN PATENT DOCUMENTS

| | | |
|---|---|---|
| KR | 10-2006-0002196 | 1/2006 |
| KR | 10-2006-0134233 | 12/2006 |
| KR | 10-2006-0134233 A | 12/2006 |
| KR | 10-2006-0002196 A | 6/2008 |
| WO | WO-2007081118 | 7/2007 |

OTHER PUBLICATIONS

Hewlett-Packard Development Company, L.P., "HP SOA Systinet Software," Data sheet, Sep. 2010, <https://hpln.hp.com/system/files/SOA_Systinet_4.0_Datasheet.pdf>.
EPO; Extended European Search Report; Office Action mailed Apr. 25, 2014.
IBM, "Enterprise architecture management," Aug. 7, 2010, web page, <http://web.archive.org/web/20100807062045/http://www-01.ibm.com/software/rational/offerings/eam/>.
IBM, "Rational System Architect—Features and benefits," Jun. 9, 2009, web page, <http://web.archive.org/web/20090609171900/http://www-01.ibm.com/software/awdtools/systemarchitect/features/?S_cmp=rnav>.
IBM, "Rational System Architect," web page, Aug. 13, 2010, <http://web.archive.org/web/20100813084120/http://www-01.ibm.com/software/awdtools/systemarchitect/>.
IBM, "WebSphere Service Registry and Repository", Frequently Asked Questions, (web page), Sep. 22, 2009, <http://web.archive.org/web/20090922222851/http://www-01.ibm.com/software/integration/wsrr/library/faqs.html>.
IDS Scheer, "ARIS Solution for Enterprise Architecture Management," Dec. 2007, <http://www.slideshare.net/Aamir97/aris-solution-for-enterprise-architecture-management?from_action=save>.
International Bureau; International Preliminary Report on Patentability (Chapter 1 of the PCT;( PCT Rule 44bis.1(c)); PCT/US2010/052794; Mailed Apr. 25, 2013.
International Searching Authority; International Search Report and the Written Opinion of the International Searching Authority, or Declaration (PCT Rule 44.1); PCT/US2010/052794; Jun. 29, 2011 Mailed.
Layer 7 Technologies, "XML Gateway Overview," Aug. 30, 2010, <http://web.archive.org/web/20100830090450/http://www.layer7tech.com/products/xml-gateway-overview>.
Layer 7 Technologies, "XML Networking Gateway," Aug. 18, 2010, <http://web.archive.org/web/20100818200514/http://www.layer7tech.com/products/xml-networking-gateway?>.
Oracle, "Oracle Web Services Manager," (web page), Aug. 5, 2010, <http://web.archive.org/web/20100805012642/http://www.oracle.com/technetwork/middleware/webservices-manager/index.html>.
Oracle, "Securing Web Services and Service-Oriented Architectures with Oracle Web Services Manager 11g," An Oracle White Paper, Jun. 2009, <http://www.oracle.com/technetwork/middleware/webservices-manager/owsm-11g-tech-wp-134065.pdf>.
Oracle, "The Oracle Enterprise Architecture Framework," White Paper, Oct. 2009, <http://www.oracle.com/technetwork/articles/entarch/oea-framework-133702.pdf>.
Wikipedia, "IBM System Architect," Sep. 17, 2010, <https://en.wikipedia.org/w/index.php?title=IBM_System_Architect&oldid=385410035>.
WSO2, "Cloud Services Gateway," Feb. 17, 2010, <http://web.archive.org/web/20100217193353/http://wso2.com/cloud/connectors/services-gateway/>.
WSO2, "Introducing WSO2 Cloud Services Gateway," Nov. 25, 2009, <http://web.archive.org/web/20091125034632/http://wso2.org/library/tutorials/introducing-wso2-cloud-services-gateway>.

* cited by examiner

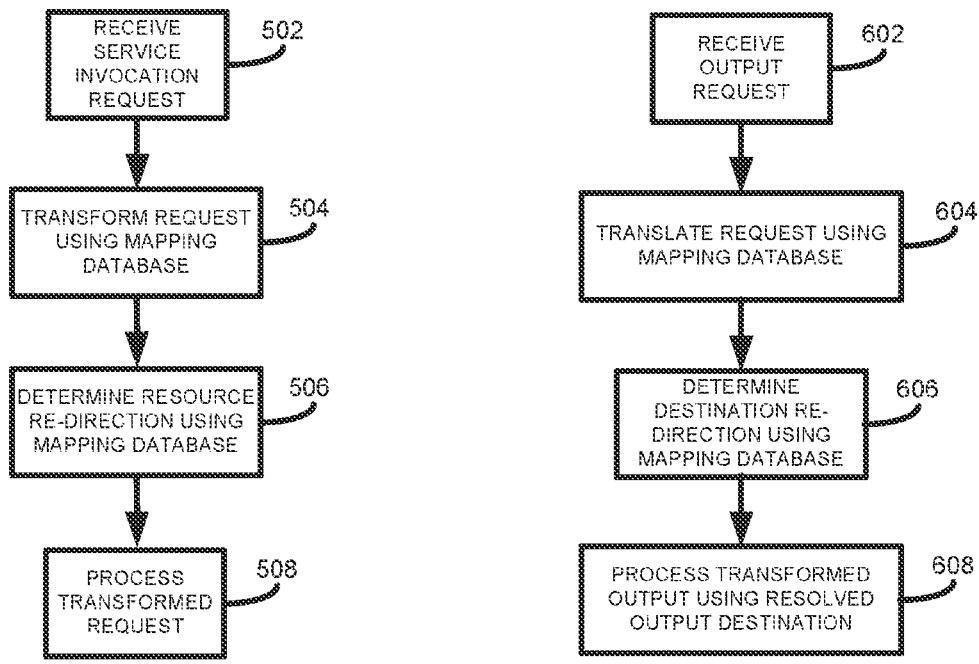
FIGURE 5
FIGURE 6
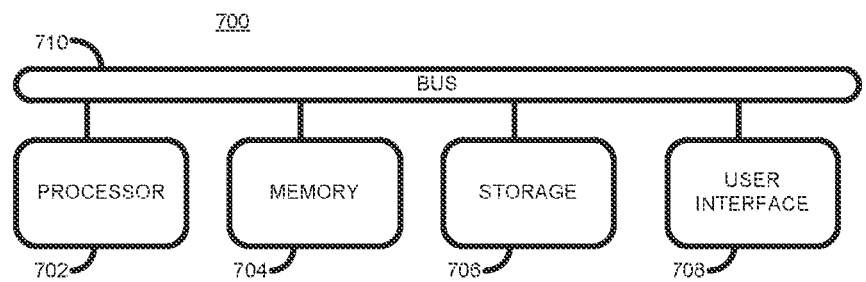
FIGURE 7

SYSTEM AND METHOD FOR PROVIDING A SERVICE

BACKGROUND

The use of electronic IT services has been growing rapidly over recent years as specialized IT service providers offer services to their clients. Clients may typically access the services through use of a client application running on client computing hardware.

For example, a service provider may provide a complex, powerful, and resource intensive IT service that clients may access via a client application running on standard personal or business computers. This is particularly advantageous for the client who can access such services without having to provide and maintain the computing hardware and software required to provide the service.

In order to optimize their service offerings, service providers may offer their services to multiple clients. However, due to differences in client infrastructure architectures and functional requirements the service provider typically needs to either provide separate, customized instances of the service for each client, or needs to provide a single service which is customized to cater for multiple clients.

However, due to the relatively short shelf-life of computing devices and software applications it is common for the IT systems of the clients, the service providers, or both, to undergo upgrades and modernization on a regular basis. Such modifications may, however, be problematic for those providing and/or for those consuming IT services.

BRIEF DESCRIPTION

Examples and embodiments of the invention will now be described, by way of non-limiting example only, with reference to the accompanying drawings, in which:

FIG. 5 is a simplified flow diagram outlining an example method according to an example of the present invention;

FIG. 6 is a simplified flow diagram outlining an example method according to an example of the present invention; and FIG. 7 is simplified block diagram illustrating an example processing system on which examples of the present invention may be implemented.

DETAILED DESCRIPTION

Figure 1:
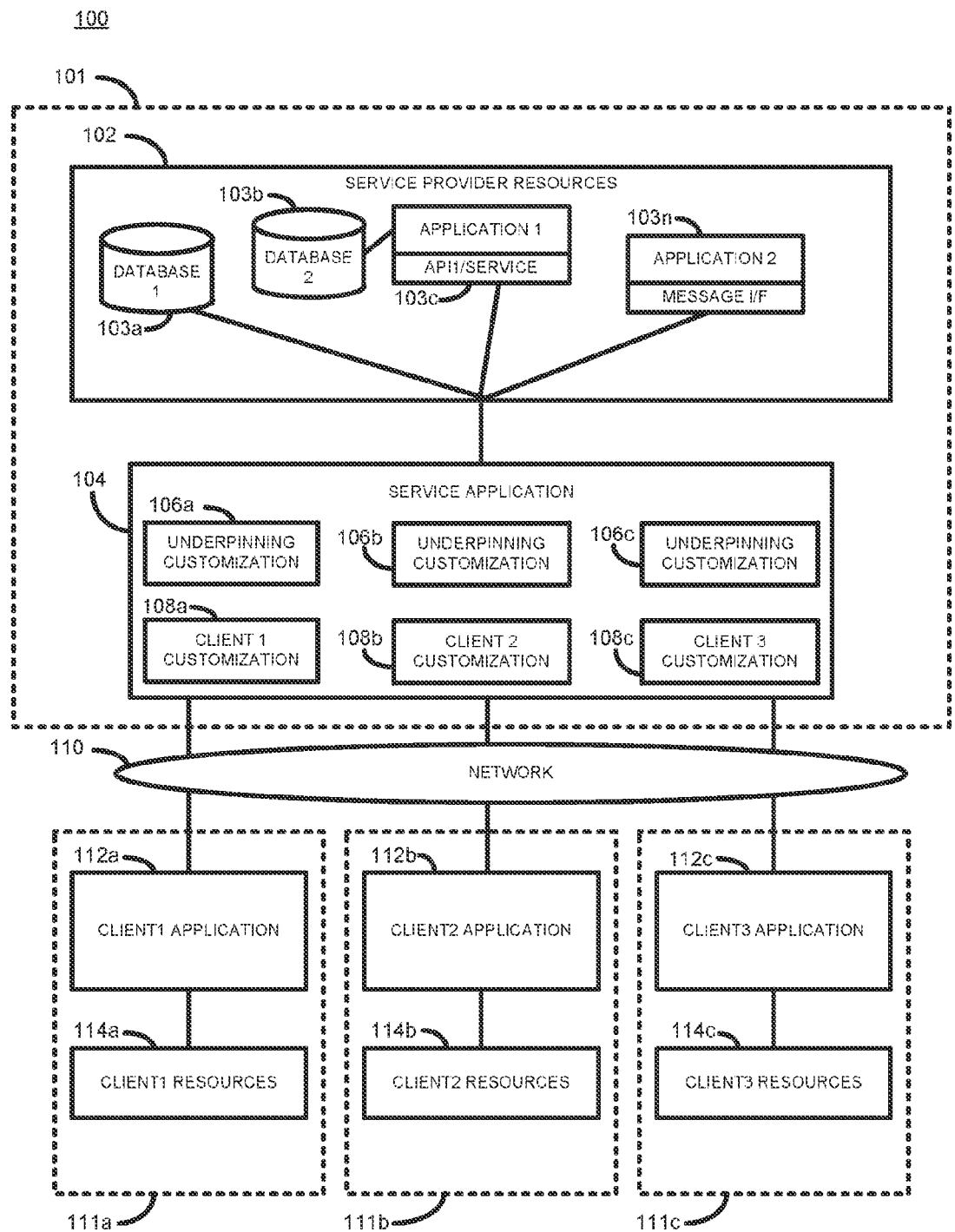
FIG. 1 is a simplified block diagram illustrating a system for providing a service according to the prior art.

Referring now to FIG. 1 there is shown a block diagram showing a simplified overview of an information technology system 100 according to the prior art. The system 100 enables an IT service provider 101 to provide IT services to one or more clients 111a, 111b, and 111c. Typically, each client 111a, 111b, 111c has a service contract with the service provider 101 for the provision and delivery of the appropriate service.

The service provider 101 has a set of service provider resources 102 which may include, for example, software applications 103c, 103n, storage (not shown), data bases 103a, 103b, and the like. The service provider resources 102 may run or be hosted on suitable computing hardware (not shown). The service provider resources 102 provide the underpinnings enabling the service provider to provide one or more IT services to one or more clients. Accordingly, the service provider resources 102 may also be referred to as service underpinnings.

The service provider 101 provides a service application 104, executing on suitable computing hardware. The service application 104 may provide any suitable IT service, such as a human resources management service, a travel planning and booking service, and the like.

The service application 104 is accessible over a network 110 by one or more clients. Each client accesses the service applications application using respective client applications 112a, 112b, and 112c. The client applications may be said to 'consume' the service provided by the service application 104, and as such may be referred to as consumer applications. Each client application 112a, 112b, and 112c executes on suitable client computing hardware (not shown) and may utilize respective client computing resources 114a, 114b, and 114c.

The business and/or IT requirements of the IT service being provided dictate which service resources, or service underpinnings, 102 are to be used by the service application 104. The service provider resources 102 could be authoritative enterprise resources, data elements, or other service building blocks. Service building blocks may include, for example, existing services or service applications, application programming interfaces (APIs), software components, and the like.

As the business and/or IT requirements change so the service provider may make changes to the service provider resources or underpinnings 102. For example, the service provider 101 may change from one database product to another. In order for the service application 104 to continue functioning in the intended manner it may be necessary for the service provider 101 to make corresponding changes to the service application 104 to take into account any changes in the service provider resources or underpinnings 102. Such changes may be made, for example, by way of one or more service underpinning customization modules 106a, 106b, 106c etc.

Different clients may have different IT infrastructures. For example, a client 111a may use a Windows operating system, whereas client 111b may use a Linux operating system. Additionally, one client may use an Oracle database, whereas another client may use a Microsoft database.

These differences in client IT architecture lead to different clients being required to interact with the servicer application 104 in different manners. Accordingly, this makes it difficult for the service provider 101 to provide a single generic service application 104 suitable for use by any client.

To cope with the differences in client IT architectures, the service application 104 includes client customization modules 108a, 108b, and 108c for each different client. The client customization modules 108a, 108b, and 108c, ensure that interaction with the service application 104 is done in the correct manner for each client application.

As IT equipment and computer software typically has a relatively short shelf-life, enterprises frequently undergo IT infrastructure modernization. Through IT modernization programs new computing technology is used to replace aging computing systems, enabling enterprises to operate with improved efficiency and reduced costs.

Similarly, a client may modify or change at least some of their computing resources 114a, 114b, 114c, after a service provider has customized a service application such as service application 104. Such changes may include, for example, a change from one database provider to another, changes to underlying computing hardware, changes in data format, and the like. However, such changes in a client IT architecture may require corresponding changes to be made in associated client customization module in the service application 104. Not surprisingly, such changes are disruptive, complex, and costly to implement.

Figure 2:
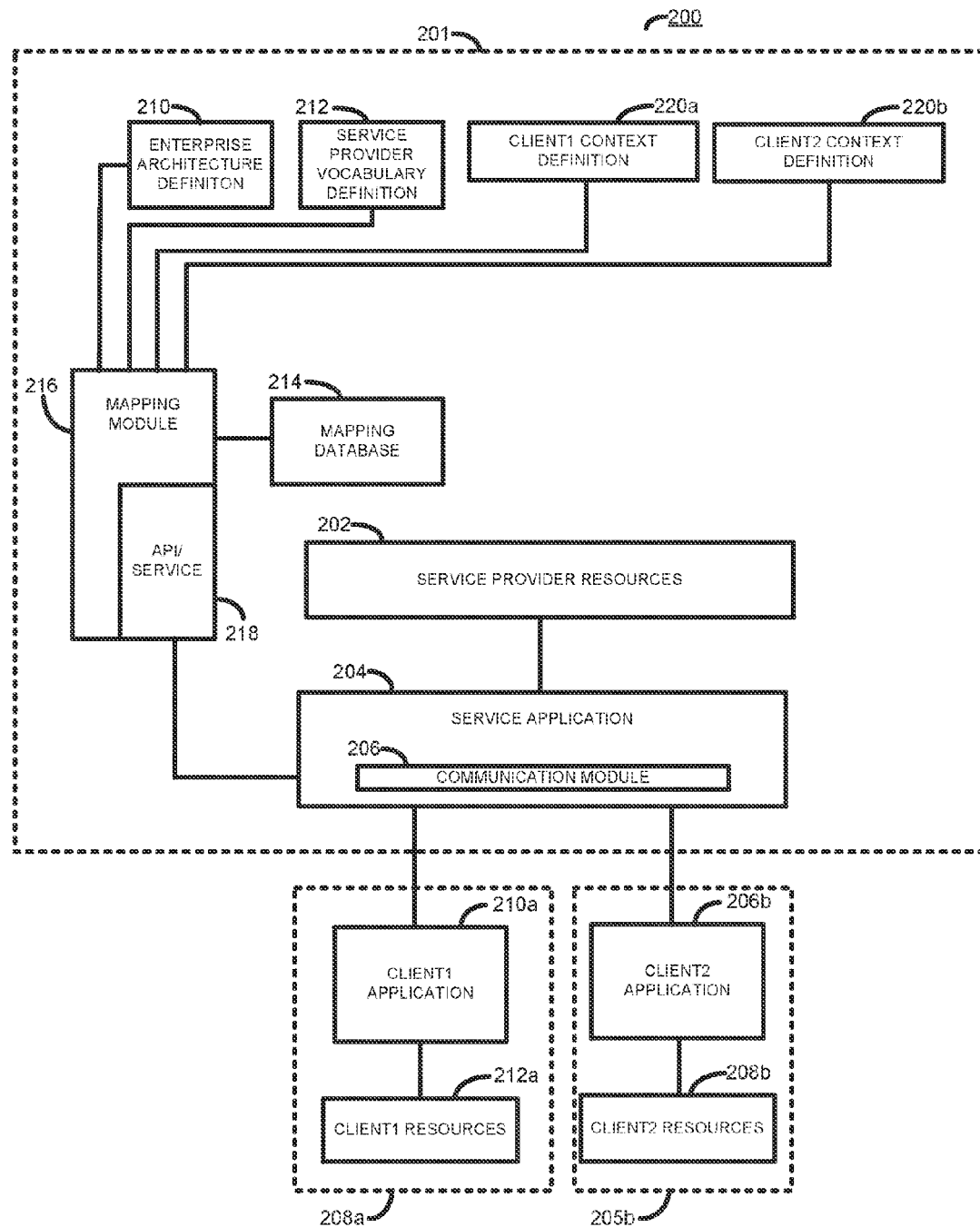
FIG. 2 is a simplified block diagram illustrating a system for providing a service according to an example of the present invention.

Referring now to FIG. 2 there is shown a simplified block diagram illustrating an information technology system 200 according to an example of the present invention. Operation of the system 200, according to an example of the present invention, is described below with additional reference to the flow diagram of FIG. 3. The system 200 enables an IT service provider 201 to provide IT services to one or more clients in a flexible manner that is more resilient to changes in either the service provider or the client resources.

The system 100 enables an IT service provider 201 to provide IT services to one or more clients 208a and 208b. For clarity only two clients are shown, although it will be appreciated that examples of the present invention are not limited to only two clients.

The IT service provider 201 has a set of service provider resources or service underpinnings 202 which may include, for example, computing hardware, software applications, storage, data bases, and the like. A service application 204 is provided which enables the clients 208a and 208b to access the IT service provided by the service application 204. Each client 208a and 208b has a respective client service application 210a and 210b which are used to consume the service. Each client 208a and 208b additionally has respective uses respective client resources 212a and 212b.

However, unlike in the system shown in FIG. 1, the service application 204 is arranged as a generic service application. In other words, it is not tied or hard-coded to any set of client resources or to any set of service provider resources. Advantageously, by decoupling the service application 204 from the service provider resources 202 and the client resources 212a, 212b enables the service provider resources 202 and/or the client resources 212a and 212b to be modified without affecting the provision of the service by the service provider 201. Accordingly, this enables both the client and the service provider to undergo IT modernization without affecting the provision of the IT service.

To enable the effective decoupling of both client and service provider resources from the service application the service application 204 additionally includes a communication module 206 for brokering processing for the service application. Additionally the system 200 includes a mapping module 216. The mapping module 216 includes an application programmer interface (API) 218 through which the communication module 206 of service application 204 obtains definitive service input and output fields and resources when providing the service, as described in greater detail below. In a further example the interface 218 of the mapping module 216 may be provided in the form of a web services interface.

The mapping module 216 generates a dynamic resource mapping database 214 that is used by the API 218. The mapping module 216 updates the mapping database 214 whenever a change in either the service provider resources or underpinnings 202, or a change in the client resources 212a or 212b, are determined.

In order to generate the mapping database 214 the mapping module 216 makes use of an enterprise architecture (EA) definition 210 that provides a detailed description of different aspects of the service provider architecture and environment. For example, an EA definition may include details of both business and technical aspects of the service provider. For example, the business aspects may include details of the business structure of the service provider, business goals, and other business information. Technical aspects may include, for example, details of the service provider computing systems, service provider software applications, service provider IT system architecture, and data definitions.

An enterprise architecture definition may define business processes and their relationships with service provider resources. For example, an EA definition may define, among other things, that:

Enterprise has 1 . . . n business units
Business units A supports 1 . . . n business processes
Business process A has 1 . . . n functions
Function A need 1 . . . n services
Services A uses 1 . . . n underpinning resources
Underpinning resource is located in Database_A/Table_1/Column_k etc)

Table 1 below shows an example extract of an enterprise architecture definition 210.

TABLE 1

EXTRACT OF AN ENTERPRISE ARCHITECTURE DEFINITION

| Business Unit/ Consumer | Functions | Services | Operations | Application | Data Source/ Structure | Data element |
|---|---|---|---|---|---|---|
| HR | New Employee hire | Personal Data | Get last name | HR Application 1 | Employee_Schema | L-Name |
| Self-service application | Retrieve personal information | Personal Data | Get last name | HR Application 1 | Personal_Data | Family name |
| Benefits Administration | Retirement_401 | My_Benefits | getMy401_Info | Benefits_App1 | 401_Data_Structure | Surname |
| Time Tracking | Track_Vacation | Vacation | Retrieve_Vacation_Plan | Tempus Carta | Vacation_Plan | LastName |
| . . . | . . . | . . . | . . . | . . . | . . . | . . . |

In addition to the EA definition 210 there is also provided a service provider vocabulary definition 212. The vocabulary definition 212 defines the nomenclature used by the service provider for providing the service. For example, the vocabulary definition 212 may define a 'standard' nomenclature of the data sources or data definitions as defined by the service provider. Each entry in the vocabulary definition includes one or more equivalent definitions as used or defined by one or more clients using the service. The data vocabulary definition does not define relationships between the data, but just shows equivalent nomenclature.

An example extract of the data vocabulary definition 212 is shown below in Table 2.

TABLE 2

EXAMPLE EXTRACT OF DATA VOCABULARY DEFINITION

| STANDARDIZED NOMENCLATURE | ALTERNATIVE NOMENCLATURE 1 | ALTERNATIVE NOMENCLENTURE 2 |
|---|---|---|
| Lastname | FamilyName | L-Name |
| EmployeeID | EMP-ID | Employee-ID |
| SSN | Tax_ID | Can_ID |
| Gross_Salary | Remuneration | Base_Salary |

In addition to the EA definition 210 and the service provider data vocabulary definition 212, there is provided a client context definition 220a, 220h, for each client who is entitled to access the service provided through the service application 204.

Each client context definition defines information about each client application (or applications) as well as the service agreements between each client application and the service provider for each service provided through the service application. The information may include, for example, a unique client identifier, its role, operations provided by each service, input and output parameters, message type and message definition, the client application identifier, data source identifiers, Universal Resource Indicators (URIs) identifying resources and how those resources are to be accessed, interface types, binding protocol and so on.

An example extract from a client context definition is shown below in Table 3.

TABLE 3

EXAMPLE EXTRACT OF CLIENT CONTEXT DEFINITION

| Service Name | Service Inputs | Service Outputs | Client application Identifier | Access Control Info |
|---|---|---|---|---|
| PersonalInformation | EMP_ID | LastName, First Name, Address | Self-service web application | Manager or employee |
| PersonalInformation | SSN | SurName, First Name, Address | Benefits_App1 | employee |
| PersonalInformation | Employee-ID | LastName, First Name | Tempus Carta | employee |
| ... | ... | ... | ... | ... |

Figure 3:
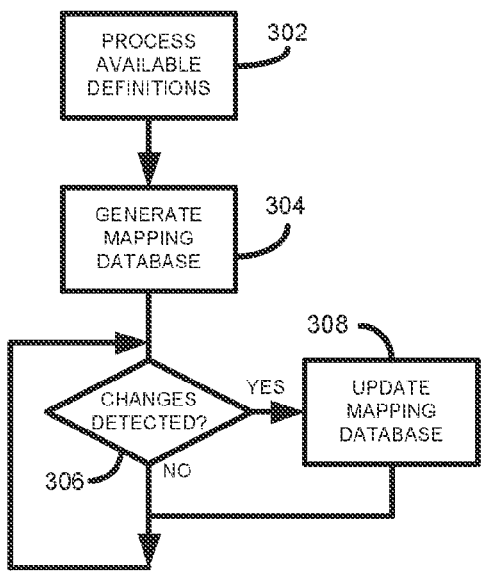
FIG. 3 is a simplified flow diagram outlining an example method according to an example of the present invention.

Turning now to FIG. 3, there is shown a simplified flow diagram outlining an example method of operating the mapping module 216 according to one example of the present invention.

The mapping module 216 processes (302) the data in the enterprise architecture definition 210, the service provider vocabulary definition 212 and the client context or contexts and generates (304) mapping data to populate the mapping database 214. Once the mapping data has been generated, the mapping module 216 determines (306) whether any changes have been made to any of the available definitions 210, 212, 220a, and 220b. Changes may be detected in any suitable manner, for example, by checking a file modification date of a definition stored as a file. If any changes are detected the mapping module 216 updates (308) the mapping database 214 with updated mapping data taking into account the determined changes.

The mapping database populated by the mapping module 216 is used by the communication module 206 to decouple the client resources 212a and 212b as well as the service provider resources 202. In this way the service application 204 does not need to maintain references to service provider resources 202 nor client resources 212a and 212b, but instead uses the communication module 206 and mapping module 216 to resolve service application inputs and outputs and to convert or translate them to appropriate service provider or client resources.

Accordingly, this decoupling enables changes to be made to service provider resources 202 and/or client resources 212a and 212b, without requiring any changes to be made to the service application 204. Advantageously, this reduces downtime of the service application due to recompilation or modification, and reduces the maintenance and customization on the service application 204.

Figure 4:
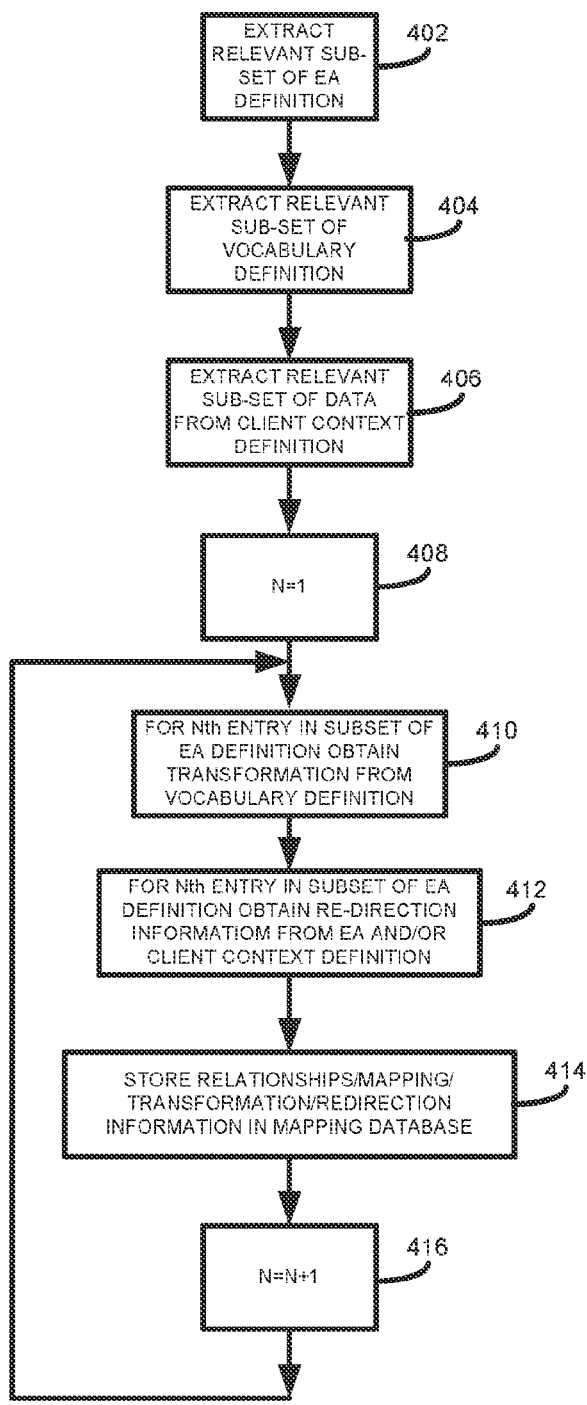
FIG. 4 is a simplified flow diagram outlining an example method according to an example of the present invention.

A more detailed explanation of the operation of the mapping module 216 will now be described with additional reference to FIG. 4.

As previously mentioned, the EA definition 210 provides a detailed description of many aspects of an enterprise. However, for the purposes of generating the mapping data for the mapping data base 214 only a subset of the information contained in the EA definition is required. Some examples of the type of information to be included in the subset of information are illustrated in Table 1 above. At 402 the mapping module 216 extracts a subset of the EA definition 210.

At 404 the mapping module 216 obtains a subset of the data comprised in the vocabulary definition 212. A subset of the vocabulary definition 212 is obtained since not all of the data stored therein may be relevant for the purposes of generating the mapping data for the mapping database 214. Some examples of typical data that may be included in the subset of obtained data are illustrated in Table 2 above.

At 406 the mapping module 216 obtains a subset of the data comprised in each of the client context definitions 220a and 220b. Again, this is because not all of the data in the client context definitions may be relevant for the purposes of generating the mapping data for the mapping database 214. Some examples of typical data that may be included in the subset of obtained data are illustrated in Table 3 above.

In other examples subsets of the different definitions 210, 212, 220a, and 220b, are not obtained. However, in examples in which the subsets are obtained the processing of the different definitions may be considerably more efficient. In a further example, the definitions 210, 212, 220a, and 220b, are pre-optimized definitions containing only relevant subsets of the full definitions.

At 408 a counter N is initialized to have the value 1.

At 410, the $N^{th}$ entry in the obtain subset of the EA definition is processed. An example of the $N^{th}$ entry is shown below in Table 4.

TABLE 4

EXAMPLE SHOWING $N^{TH}$ ENTRY IN THE ENTERPRISE ARCHITECTURE DEFINITION

| Business Unit/ Consumer | Functions | Services | Operations | Application | Data Source/ Structure | Data element |
|---|---|---|---|---|---|---|
| HR | New Employee hire | Personal Data | Get last name | HR Application 1 | Employee Data Schema | L-Name |

The mapping module 216 identifies the name of the data element defined which in this case is called "L-Name". The mapping module 216 then obtains (410) from the obtained subset of the vocabulary definition 212 the standard nomenclature to which the data element "L-Name" maps. From Table 2 above it can be seen that the standard nomenclature associated with the data element "L-name" is "Lastname". The mapping module 216 may obtain the standard nomenclature corresponding to the data element in the current entry using any appropriate technique, such as using suitable search techniques.

At 412 the mapping module uses the standards based interfaces, connectors and APIs as defined by the enterprise architecture definition 210 and the client context definitions 220a, 220b to retrieve information such as data source name, schema name, table name, column name, universal resource indicator (URI), API name, API type, protocol/port and so on. The mapping module 216 parses, analyzes, correlates, and fuses this information, as required, to derive a set of 'redirection' or mapping data. At 414 the mapping module 216 stores the mapping, transformation, or redirection information in a suitable form in the mapping database 214.

At 416 the counter N is incremented, and the above-described process is repeated for each entry in the obtained subset of the enterprise architecture definition.

As each entry is processed the mapping database 214 is populated with the derived mapping data. An example extract of the generated mapping data is shown below in Table 5.

In further examples additional data may be included in the mapping database 214 during the above-described process. Such additional data may include, for example details of a universal resource indicator (URI) which contains the information about where and how to reach the resource or return destination.

Once the mapping database 214 has been populated it may be used by the service provider in providing the service provided through the service application 204.

Operation of the communication manager 206 will now be described below with additional reference to the flow diagrams of FIGS. 5 and 6.

The service application 204 may provide the service to the client in a number of different manners. In one example, the service application 204 is invoked using a request/response type protocol. In another example, the service application 204 may be invoked using an API, remote procedure calls, asynchronous messaging or the like. In the present example, however, it is assumed that the service application 204 is invoked using a request/response type protocol.

At 502 the communication manager 206 receives a service invocation request. The service invocation request may, for example, be in the form of a message containing the name of a service function to invoke, the name of a data element a value for which is to be returned to the client, or in any other suitable form.

TABLE 5

EXAMPLE EXTRACT OF THE MAPPING DATABASE

| Context | Service | Input Data Structure | Data source/ URI | Destination URI | Source URI | Output Data Structure |
|---|---|---|---|---|---|---|
| Business process 1 | Service 1 | data_struct_1 | DS1 | URI5 | L-name | Out_data { LastName ... } |
| Business process 2 | Service 1 | data_struct_1 | DS3 | URI6 | ClassA. Method1( ) | Out_data { LastName ... } |
| Client1 | Service 2 | data_struct_2 | DS5 | URI 1 | Table1.column1 | Out_data { LastName ... } |
| Client2 | Service 2 | data_struct_2 | DS1 | URI 2 | FamilyName | Out_data { LastName ... } |
| Client 3 | Service 2 | data_struct_3 | DS3 | URI 3 | ClassA.Method 1( ) | Out_data { LastName ... } |
| ... | ... | ... | ... | ... | ... | ... |

In one example the mapping database may be generated using semantic web technology where a web ontology language (OWL) or resource description framework (RDF) ontology may be used to describe the mapping data in the mapping data base using subject, predicate and object. In this example subject may relate to Service and objects may relate to context, attribute, data source data element, and standardized name.

At 504 the communication manager 206 uses the mapping module 216 to translate or transform the request message into a service invocation request in a suitable form for use with the service application 204.

For example, if the received service invocation message request includes a service function GetLName(LName) the mapping module 216 may transform this to the service application service function GetPersonalDetails(LastName).

At 506, the communication manager 206 uses the mapping module 216 to determine a service provider resource redirection as illustrated in Table 5. For example, when a client 1 accesses a service 2 the service 2 may retrieve the data element LastName from Table1.column1. When a client 3 accesses a service 2 the service 2 may retrieve the data element LastName though use of an API call ClassA.Method1( ).

At 508, the communication manager 206 of the service provider application 204 processes the transformed request to, for example, access the resolved resource or resources to obtain the required data. This may be achieved, for example, by sending the transformed service invocation request to one of the service provider resources 103a to 103n.

When the service application 204 responds to a service invocation request message the communication module 206 receives (602) an output response request.

At 604 the communication module 206 uses the mapping module 216 to translate or transform the output response request into a suitable form for the client who sent the initial corresponding original service invocation message.

At 606 the communication module 206, again using the mapping module 216, determines a client resource redirection as illustrated in Table 5 above. For example, when using service 2, client 1 expects the output data structure 'Out_data' to be returned using the URI1 which may point to a service provider message queue. When a client 2 uses the same service (service 2) client 2 may need the service 2 to return the same output data structure via a web service pointed to by the URI2.

At 608 the communication module 206 processes the transformed request, for example, to cause the transformed output request to be sent to the appropriate client in the appropriate format.

For example, if client application 210a of client 208a invokes the service application 104 with the invocation service1.getAddress( ) the communication module 206 transforms the invocation, through use of API 218 of the mapping module 216, to a service provider invocation suitable to obtain the data in the service provider resource dataSrc2.permanentAddress. However, if the client application 206b of client 208b invokes the service application 104 with the same service invocation, service1.getAddress( ), the communication module 206 transforms the invocations, through use of the API 218 of the mapping module 216, to a service provider invocation suitable to obtain the data in the service provider resource dataSrc2.mailingAddress.

By way of further example, depending on the particular service contracts between a client and the service provider (as detailed in the client contexts), a service invocation received at the communication module 206 from one client may be transformed to differently service provider invocation compared to the same service invocation received from a different client. For example, a service invocation received from one client may be transformed to use an API of a service provider resource, whereas the same service invocation received from a different client may be transformed to use a web services interface of the same or a different service provider resource.

In other words, the communication module 206 transforms an incoming service invocation to a service provider invocation, with the nature of the transformation being dependent on the mapping data in the mapping database 214 which is generated based on the enterprise architecture definition, the service provider vocabulary definition, and the client context definition(s).

The communication module 206 may additionally transform outputs from the service provider application 204 into outputs suitable for the client application to which the output is intended in the same manner.

In the above examples the enterprise architecture definition 210, the service provider vocabulary definition 212, and the client context definitions 220a and 220b have been shown in table form. It will be appreciated, however, that the definitions are not so limited thereto. For example, it will be appreciated that at least some of the definitions may be defined using semantic web technology based ontologies. As will be appreciated, use of ontologies may give greater freedom of definition.

Turning now to FIG. 7 there is shown a block diagram of computer system 700 on which the mapping module 216 may be implemented in one example. For example, the mapping module 216 may be implemented by way of programming instructions stored on a non-transitory computer readable storage medium 704 or 706. The memory 704 and storage 706 are coupled to a processor 702, such as a microprocessor, through a communication bus 710. The instructions, when executed by the processor 702 provide the functionality of a mapping module as described above by executing the above-described method steps.

It will be appreciated that examples and embodiments of the present invention can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement embodiments of the present invention. Accordingly, examples provide a program comprising code for implementing a system or method as claimed in any preceding claim and a machine readable storage storing such a program. Still further, examples of the present invention may be conveyed electronically via any medium such as a communication signal carried over a wired or wireless connection and examples suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A system for providing a service, the service being accessible from a client application and being provided through a service application using a set of service provider resources, the system comprising:
   a mapping module for generating mapping data, the mapping data being generated in part from an enterprise architecture definition, in part from a vocabulary definition; and in part from a client context definition; and a communication module for:
  receiving a communication request;
  transforming the communication request using the generated mapping data; and
  processing the transformed communication request.

2. The system of claim 1, wherein the mapping module is further configured to:
  detect a change in one of the enterprise architecture definition, the vocabulary definition, and the client context definition; and
  update the generated mapping data in accordance with the detected change.

3. The system of claim 1, wherein the mapping module is configured to generate the mapping data from a sub-set of the enterprise architecture definition, a sub-set of the vocabulary definition, and a sub-set of the client context definition.

4. The system of claim 1, wherein the communication module is further configured to transform the received request by obtaining resource redirection data from the mapping database.

5. The system of claim 1, wherein the communication module is configured to receive a communication request in the form of a service invocation from a client application.

6. The system of claim 5, wherein the communication module is configured to transform the service invocation using the generated mapping data and to process the transformed service invocation to invoke a service on one of the service provider resources.

7. The system of claim 1, wherein the communication module is configured to receive a communication request in the form of an output request.

8. The system of claim 7, wherein the communication module is configured to transform the output request using the generated mapping data and to process the transformed output request to send an output to a client application.

9. The system of claim 1, wherein the communication module is configured to receive communication requests from a plurality of client applications.

10. A computer implemented method of providing a service through a service application, the service being accessible from a client application and being provided by a set of service provider resources, comprising:
  generating, by a first processor, mapping data from an enterprise architecture, a vocabulary definition, and a client context;
  receiving, at a second processor, a service invocation;
  transforming, at the second processor, the service invocation using the generated mapping data; and
  processing, at the second processor, the transformed service invocation.

11. The method of claim 10, further comprising:
  determining when a change has occurred in at least one of the definitions; and
  generating updating the mapping data corresponding to the determine change.

12. The method of claim 10, wherein the step of generating mapping data further comprises:
  obtaining a sub-set of at least one of the definitions; and
  generating the mapping data based on at least the one obtained definition sub-set.

13. The method of claim 10, wherein the step of transforming further comprises:
  obtaining resource redirection data from a mapping database; and transforming the request based on the obtained redirection data.

14. The method of claim 10, wherein the step of receiving a communication request is adapted for receiving a service invocation.

* * * * *